United States Patent
Lee et al.

(10) Patent No.: US 10,983,403 B2
(45) Date of Patent: Apr. 20, 2021

(54) FLEXIBLE LIQUID CRYSTAL FILM USING FIBER-BASED FOLDABLE TRANSPARENT ELECTRODE AND METHOD OF FABRICATING THE SAME

(71) Applicant: INDUSTRIAL COOPERATION FOUNDATION CHONBUK NATIONAL UNIVERSITY, Jeonju-si (KR)

(72) Inventors: Seung Hee Lee, Jeonju-si (KR); Byoung Suhk Kim, Jeonju-si (KR); In Chul Kim, Gyeryong-si (KR); Tae Hyung Kim, Jeonju-si (KR); Chae-Song Kwak, Iksan-si (KR)

(73) Assignee: INDUSTRIAL COOPERATION FOUNDATION CHONBUK NATIONAL UNIVERSITY, Jeonju-si (KR)

( * ) Notice: Subject to any disclaimer, the term of this patent is extended or adjusted under 35 U.S.C. 154(b) by 0 days.

(21) Appl. No.: 16/360,157

(22) Filed: Mar. 21, 2019

(65) Prior Publication Data
US 2019/0302508 A1 Oct. 3, 2019

(30) Foreign Application Priority Data
Mar. 28, 2018 (KR) .......... 10-2018-0035917

(51) Int. Cl.
*G02F 1/1343* (2006.01)
*G02F 1/1333* (2006.01)
*G02F 1/1334* (2006.01)

(52) U.S. Cl.
CPC .... *G02F 1/13439* (2013.01); *G02F 1/133305* (2013.01); *C09K 2323/00* (2020.08);
(Continued)

(58) Field of Classification Search
CPC .......... G02F 1/13439; G02F 1/133305; G02F 1/1334; G02F 2201/02; G02F 2202/022;
(Continued)

(56) References Cited

U.S. PATENT DOCUMENTS

2008/0259262 A1* 10/2008 Jones ............ H05K 3/245
349/139
2015/0355540 A1* 12/2015 Shin .............. G03F 7/0047
430/18

FOREIGN PATENT DOCUMENTS

KR 10-2015-0070468 6/2015
KR 10-1595895 2/2016
(Continued)

OTHER PUBLICATIONS

Chen et al., "Transparent PMMA composite reinforced with nanofibers", Polymer Composite, 2009, p. 239-247. (Year: 2009).*
(Continued)

*Primary Examiner* — Ruiyun Zhang
(74) *Attorney, Agent, or Firm* — Lex IP Meister, PLLC

(57) ABSTRACT

A flexible liquid crystal film using a fiber-based foldable transparent electrode and a method of fabricating the same are provided. A flexible liquid crystal film using a fiber-based foldable transparent electrode according to an exemplary embodiment of the present disclosure, the flexible liquid crystal film includes: a pair of fiber-based foldable transparent electrodes in which a nanofiber transparent thin film formed of a polymer and a Nylon-6 nanofiber is coated with a silver (Ag) nanowire; and a dispersed liquid crystal formed by being cured between the pair of fiber-based foldable transparent electrodes.

5 Claims, 20 Drawing Sheets

(52) U.S. Cl.
CPC ...... *C09K 2323/04* (2020.08); *C09K 2323/05* (2020.08); *C09K 2323/06* (2020.08); *G02F 1/1334* (2013.01); *G02F 2201/02* (2013.01); *G02F 2202/022* (2013.01); *G02F 2202/16* (2013.01); *G02F 2202/28* (2013.01); *G02F 2202/36* (2013.01)

(58) Field of Classification Search
CPC ............ G02F 2202/16; G02F 2202/28; G02F 2202/36; Y10T 428/10; Y10T 428/1055; Y10T 428/1086; C09K 2323/00; C09K 2323/04; C09K 2323/05; C09K 2323/06
USPC ...... 428/1.1, 1.4, 1.6, 1.5; 349/16, 158, 139; 977/762
See application file for complete search history.

(56) References Cited

FOREIGN PATENT DOCUMENTS

| | | |
|---|---|---|
| KR | 10-2017-0058895 | 5/2017 |
| KR | 20170074207 A * | 6/2017 |

OTHER PUBLICATIONS

Kim et al "Foldable transparent nanofiber-based electrode for LC smart devices"., Nature, 2018, 8:11517 (Year: 2018).*

Hadi HosseinzadehKhaiigh et al., "Silvernanowiretransparentelectrodesforliquidcrystal-based smart windows", SolarEnergyMaterials & SolarCells,vol. 132, pp. 337-341, 2015.

* cited by examiner

|  | Young's modulus (MPa) | Tensile strength (MPa) | Toughness (kN/mm) |
|---|---|---|---|
| Cellulose (CA) | 192.7 | 16.2 | 65.7 |
| NF-r-CA 15 | 756.9 | 29.4 | 134.1 |
| NF-r-CA 30 | 794.4 | 43.02 | 262.53 |
| NF-r-CA 45 | 914.9 | 59.66 | 586.0 |

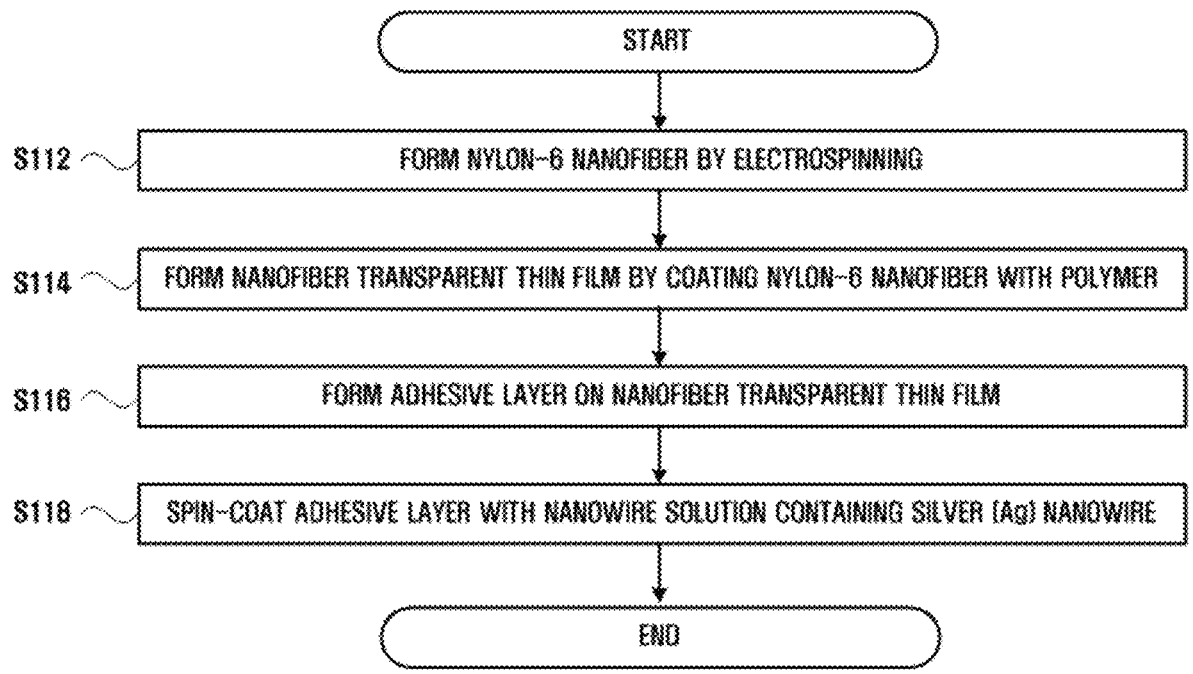

FLEXIBLE LIQUID CRYSTAL FILM USING FIBER-BASED FOLDABLE TRANSPARENT ELECTRODE AND METHOD OF FABRICATING THE SAME

BACKGROUND

1. Field

The present disclosure relates to a flexible liquid crystal film using a fiber-based foldable transparent electrode and a method of fabricating the same.

2. Description of Related Art

Recently, a foldable transparent electrode used in many wearable optoelectronic devices such as a touch screen, an organic light emitting diode (OLED), a solar cell, an electronic skin (e-Skin), and the like has been spotlighted. Basically, the foldable transparent electrode is required to have optical transparency, a low electrical resistance, and extremely high bending toughness without a significant deterioration of electrical performance. In general, a resistance and an optical transmittance tend to be opposite to each other. Accordingly, it is important to achieve an optimum balance between an electrical resistance and an optical transmittance so as to obtain a transparent electrode having high conductivity.

Conventionally, a commercial indium tin oxide (ITO) electrode has been widely used in a transparent conductive optoelectronic device. However, in a case where the ITO electrode is used in flexible electronic applications, there are problems such as a shortage of indium, a high cost in a fabrication process, and mechanical brittleness. Therefore, research using a new material has been conducted to overcome such a problem of the ITO electrode. For example, transparent electrode materials such as a conductive polymer, a carbon nanotube (CNT), graphene, a metal nanowire, and a metal nanotrough network, and a fusion material thereof have been used in the fabrication of a transparent electrode having a low resistance and a high flexibility.

However, polymer-based films such as a polyethylene terephthalate (PET) film and a polyethylene naphthalate (PEN) film, which are used as a flexible substrate for most transparent films, are limited in an ultimate bending with a radius of curvature of within 1 mm.

Meanwhile, a liquid crystal display (LCD) is widely used in the display market, but since a liquid crystal is a fluid material, it is difficult to maintain a liquid crystal layer between volatile ITO electrodes under external pressure, bending distortion, and mechanical impact. Therefore, it is difficult to implement a flexible LCD, basically. However, liquid crystal (LC) droplets of a mixture of a polymer and a liquid crystal such as a polymer-dispersed liquid crystal (PDLC) and an isotropic liquid crystal (OILC) are embedded in a polymer matrix, such that the problem may be overcome for application of the flexible LCD. Recently, PDLC has been used in switchable electronic devices such as a display, a smart window, a micro lens, and a data storage device.

However, since a conventional PDLC uses a transparent ITO having a limited flexibility, its application is still limited.

RELATED ART DOCUMENT

Patent Document (Patent Document 1) Korean Patent No. 1572194 (registered on Nov. 20, 2015)

(Patent Document 2) Korean Patent No. 1595895 (registered on Feb. 15, 2016)

SUMMARY

An object of the present disclosure is to provide a flexible liquid crystal film using a fiber-based foldable transparent electrode which is reinforced with a nanofiber, transparent, and foldable and a method of fabricating the same.

Objects are not limited to the aforementioned objects and other objects not mentioned herein will be clearly understood from the following description by those skilled in the art.

According to an exemplary embodiment of the present disclosure, a flexible liquid crystal film using a fiber-based foldable transparent electrode, includes: a pair of fiber-based foldable transparent electrodes in which a nanofiber transparent thin film formed of a polymer and a Nylon-6 nanofiber is coated with a silver (Ag) nanowire; and a dispersed liquid crystal formed by being cured between the pair of fiber-based foldable transparent electrodes.

In the nanofiber transparent thin film, a ratio of a refractive index of the polymer to a refractive index of Nylon-6 of the Nylon-6 nanofiber may be 0.964 to 0.998:1.

The polymer may include at least one of poly(vinyl acetate), cellulose acetate, or poly(acrylic acid).

In the fiber-based foldable transparent electrode, an adhesive layer may be formed on the nanofiber transparent thin film, and the adhesive layer may be spin-coated with a nanowire solution containing the silver (Ag) nanowire.

The adhesive layer may be formed of polyethyleneimine (PEI).

A content of the silver (Ag) nanowire in the nanowire solution may be 0.025 wt % to 0.05 wt %.

The dispersed liquid crystal may be formed by photocuring a mixture of a nematic liquid crystal and a photocurable monomer between the pair of fiber-based foldable transparent electrodes.

According to another exemplary embodiment of the present disclosure, a method of fabricating a flexible liquid crystal film using a fiber-based foldable transparent electrode, includes: preparing a pair of fiber-based foldable transparent electrodes; attaching the pair of fiber-based foldable transparent electrodes to a pair of substrates, respectively, using a thermal release tape; applying a thermosetting sealant including a spacer on an edge of at least one of the pair of fiber-based foldable transparent electrodes; disposing a mixture formed of a nematic liquid crystal and a photocurable monomer on a surface of at least one of the pair of fiber-based foldable transparent electrodes; covering an upper portion of the mixture with the other one of the pair of fiber-based foldable transparent electrodes; attaching the pair of fiber-based foldable transparent electrodes to each other by curing the thermosetting sealant with heat; removing one substrate of the pair of substrates by separating the thermal release tape from the pair of fiber-based foldable transparent electrodes; forming a dispersed liquid crystal by photocuring the mixture with light irradiation; and removing the other substrate of the pair of substrates by separating the thermal release tape from the pair of fiber-based foldable transparent electrodes.

The preparing of the transparent electrode may include: forming a Nylon-6 nanofiber by electrospinning a spinning solution containing Nylon-6; forming a nanofiber transparent thin film by coating the Nylon-6 nanofiber with a polymer; forming an adhesive layer on the nanofiber transparent thin film; and spin-coating the adhesive layer with a nanowire solution containing a silver (Ag) nanowire.

In the disposing of the mixture, a content of the nematic liquid crystal may be 50 to 70 wt % and a content of the photocurable monomer may be 30 to 50 wt %.

Specific items of the present disclosure are included in the detailed description and drawings.

According to the present disclosure, a flexible liquid crystal film using a fiber-based foldable transparent electrode that has an excellent optical transmittance and mechanical property and is transparent and foldable may be provided.

In addition, flexibility and bendability that cannot be obtained in an indium tin oxide (ITO) electrode may be implemented based on a nanofiber.

BRIEF DESCRIPTION OF DRAWINGS

FIG. 19 is a flowchart showing process of preparing a pair of fiber-based foldable transparent electrodes according to an exemplary embodiment of the present disclosure.

DETAILED DESCRIPTION

Figure 1:
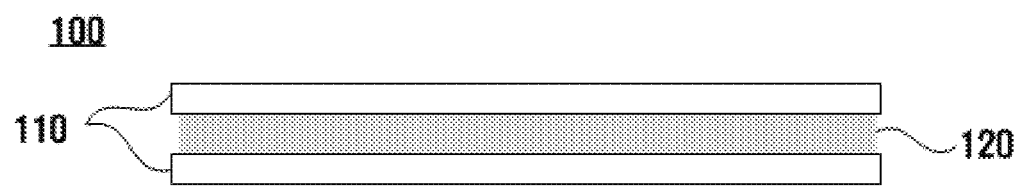
FIG. 1 is a cross-sectional view showing a flexible liquid crystal film using a fiber-based foldable transparent electrode according to an exemplary embodiment of the present disclosure.

Hereinafter, a preferred exemplary embodiment of the present disclosure will be described in detail with reference to the accompanying drawings. Various advantages and features of the present disclosure and methods accomplishing them will become apparent from the following description of exemplary embodiments with reference to the accompanying drawings. However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims. Throughout the specification, like reference numerals denote like elements.

It will be understood that, although the terms first, second, and the like may be used herein to describe various elements, components, and/or sections, but these elements, components, and/or sections should not be limited by these terms. These terms are only used to distinguish one element, component, or section from another element, component, or section. Accordingly, a first element, a first component, or a first section mentioned below may be a second element, a second component, or a second section without departing from the technical spirit of the present disclosure.

Terms used in the present specification are for explaining exemplary embodiments rather than limiting the present disclosure. In the present disclosure, a singular form includes a plural form unless explicitly described to the contrary. Components, steps, operations, and/or elements mentioned by terms "comprise" and/or "made of" used in the present disclosure do not exclude the existence or addition of one or more other components, steps, operations, and/or elements.

Unless defined otherwise, all terms (including technical and scientific terms) used in the present specification have the same meaning as meanings commonly understood by those skilled in the art to which the present disclosure pertains. Further, unless defined otherwise, all terms defined in generally used dictionaries may not be ideally or overly interpreted.

Hereinafter, the present disclosure will be described in detail with reference to the accompanying drawings.

FIG. 1 is a cross-sectional view showing a flexible liquid crystal film using a fiber-based foldable transparent electrode according to an exemplary embodiment of the present disclosure.

Referring to FIG. 1, a flexible liquid crystal film 100 using a fiber-based foldable transparent electrode (hereinafter, referred to as a flexible liquid crystal film) includes a pair of fiber-based foldable transparent electrodes 110 and a dispersed liquid crystal 120. In this case, in the fiber-based foldable transparent electrode 110, a nanofiber transparent thin film formed of a polymer and a Nylon-6 nanofiber is coated with a silver (Ag) nanowire. The dispersed liquid crystal 120 is formed by being cured between the pair of fiber-based foldable transparent electrodes 110.

The Nylon-6 nanofiber may be obtained by electrospinning a Nylon-6 solution. As an example, a Nylon-6 nanofiber may be fabricated by electrospinning a Nylon-6 solution on a washed indium tin oxide (ITO) glass substrate.

The nanofiber transparent thin film may be formed of a polymer and a Nylon-6 nanofiber. As an example, the nanofiber transparent thin film may be fabricated by immersing a Nylon-6 nanofiber in a liquid polymer, by pouring a liquid polymer into a Nylon-6 nanofiber, or by spraying a liquid polymer to Nylon-6 nanofiber.

In this case, a ratio of a refractive index of the polymer to a refractive index of the Nylon-6 of the Nylon-6 nanofiber may be 0.964 to 0.998:1. In addition, the polymer may include at least one of poly(vinyl acetate), cellulose acetate, or poly(acrylic acid).

According to an exemplary embodiment of the present disclosure, when the ratio of the refractive index of the polymer to the refractive index of the Nylon-6 is 0.964 to 0.998:1, an optical transmittance of the nanofiber transparent thin film formed of the polymer and the Nylon-6 nanofiber may be significantly increased in comparison to an optical transmittance of the Nylon-6 nanofiber.

Hereinafter, a relationship between the optical transmittance and a ratio of the refractive index of the polymer to the refractive index of the Nylon-6 according to an exemplary embodiment of the present disclosure will be described in detail.

TABLE 1

| | Polymer | Refractive Index |
|---|---|---|
| 1 | Nylon-6 | 1.53 |
| 2 | Poly(vinylidene fluoride) | 1.42 |
| 3 | Poly(vinyl acetate) | 1.467 |
| 4 | Cellulose acetate | 1.475 |
| 5 | Poly(acrylic acid) | 1.527 |
| 6 | Polystyrene | 1.589 |

Referring to Table 1, a refractive index of Nylon-6 is 1.53, a refractive index of poly(vinylidene fluoride) is 1.42, a refractive index of poly(vinyl acetate) is 1.467, a refractive index of cellulose acetate is 1.475, a refractive index of poly(acrylic acid) is 1.527, and a refractive index of polystyrene is 1.589.

Figure 2:
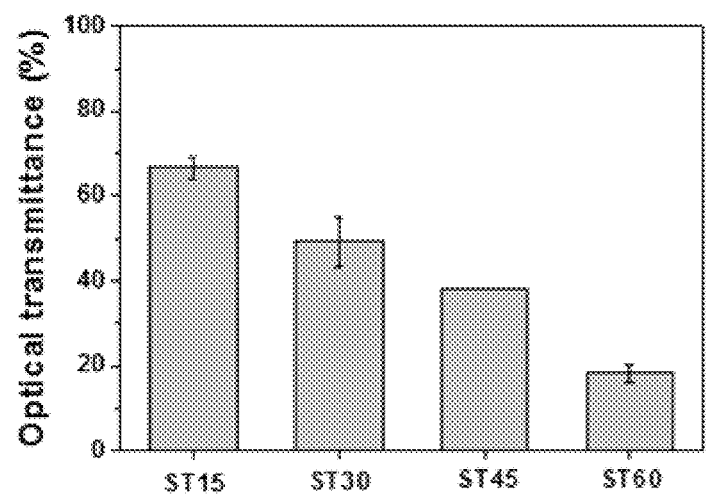
FIG. 2 is a graph showing an optical transmittance of a Nylon-6 nanofiber depending on electrospinning time according to an exemplary embodiment of the present disclosure.

FIG. 2 is a graph showing an optical transmittance of a Nylon-6 nanofiber depending on electrospinning time according to an exemplary embodiment of the present disclosure.

The optical transmittance of the Nylon-6 nanofiber was measured by a UV-visible spectroscopy.

Referring to FIG. 2, the optical transmittance of the Nylon-6 nanofiber is decreased as electrospinning time for fabricating a Nylon-6 nanofiber increases.

In detail, the optical transmittance of the Nylon-6 nanofiber is 66% when the electrospinning time is 15 minutes, is 50% when the electrospinning time is 30 minutes, is 38% when the electrospinning time is 45 minutes, and is 15% when the electrospinning time is 60 minutes, that is, it may be confirmed that the optical transmittance of the Nylon-6 nanofiber is decreased as the electrospinning time increases.

Hereinafter, a polymer which significantly increases the optical transmittance of the nanofiber transparent thin film as compared with the optical transmittance of the Nylon-6 nanofiber and a correlation between an optical transmittance and a refractive index will be described in detail.

Figure 3:
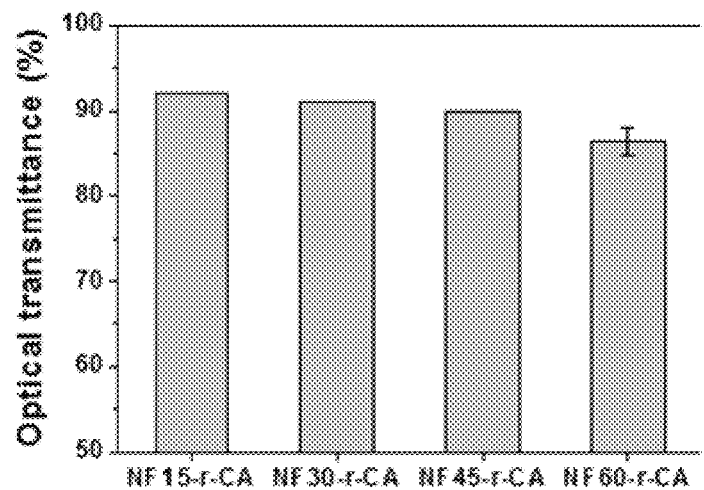
FIG. 3 is a graph showing an optical transmittance of a nanofiber transparent thin film coated with cellulose acetate (CA) according to an exemplary embodiment of the present disclosure.

FIG. 3 is a graph showing an optical transmittance of a nanofiber transparent thin film coated with cellulose acetate (CA) according to an exemplary embodiment of the present disclosure.

Referring to FIG. 3, the respective Nylon-6 nanofibers fabricated by electrospinning Nylon-6 solutions for 15 minutes, 30 minutes, 45 minutes, and 60 minutes were coated with cellulose acetate, and then each of the optical transmittances of the Nylon-6 nanofibers was measured.

It may be appreciated that the optical transmittance of the nanofiber transparent thin film is increased 1.4 times to 5.7 times the optical transmittance of the Nylon-6 nanofiber from the fact that the optical transmittance of the nanofiber transparent thin film formed of a polymer and a Nylon-6 nanofiber was measured to be 86% to 92% by coating the nanofiber transparent thin film with cellulose acetate (refer to comparison between FIG. 2 and FIG. 3).

In detail, the optical transmittance of the Nylon-6 nanofiber fabricated by performing electrospinning for 15 minutes is 66% (refer to FIG. 2), the optical transmittance of the nanofiber transparent thin film fabricated by performing electrospinning for 15 minutes is 92% (refer to FIG. 3), and the ratio of the optical transmittance of the Nylon-6 nanofiber to the optical transmittance of the nanofiber transparent thin film is 1:1.4. Therefore, the optical transmittance of the nanofiber transparent thin film is increased about 1.4 times the optical transmittance of the Nylon-6 nanofiber.

In addition, the optical transmittance of the Nylon-6 nanofiber fabricated by performing electrospinning for 60 minutes is 15% (refer to FIG. 2), the optical transmittance of the nanofiber transparent thin film fabricated by performing electrospinning for 60 minutes is 86% (refer to FIG. 3), and the ratio of the optical transmittance of the Nylon-6 nanofiber to the optical transmittance of the nanofiber transparent thin film is 1:5.7. Therefore, the optical transmittance of the nanofiber transparent thin film is increased about 5.7 times the optical transmittance of the Nylon-6 nanofiber.

Referring back to Table 1, a ratio of the refractive index of the Nylon-6 to the refractive index of the cellulose acetate is 1:0.964.

When the ratio of the refractive index of the Nylon-6 to the refractive index of the cellulose acetate (CA) is 1:0.964, the optical transmittance of the nanofiber transparent thin film coated with cellulose acetate (CA) is increased by 1.4 times to 5.7 times, regardless of electrospinning times of 15 minutes, 30 minutes, 45 minutes, and 60 minutes. This seems to be due to the fact that a void of the Nylon-6 nanofiber is filled with the cellulose acetate (CA).

Figure 4:
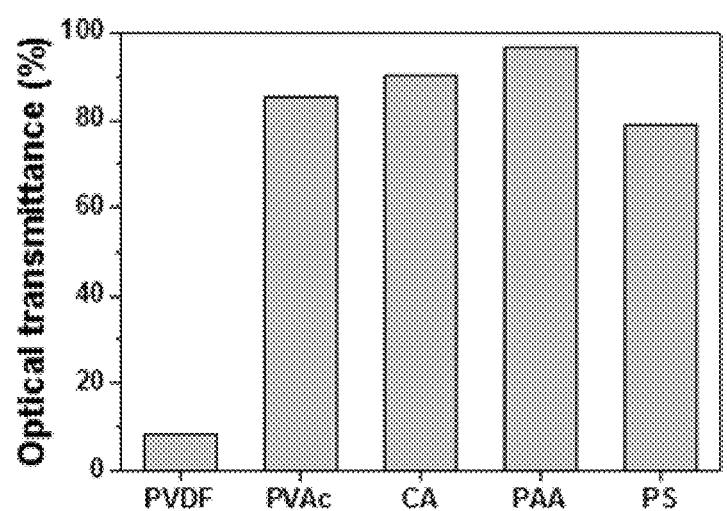
FIG. 4 is a graph showing optical transmittances of nanofiber transparent thin films coated with various polymers (PVDF, PVAc, CA, PAA, and PS) according to an exemplary embodiment of the present disclosure.

FIG. 4 is a graph showing optical transmittances of nanofiber transparent thin films coated with various polymers (PVDF, PVAc, CA, PAA, and PS) according to an exemplary embodiment of the present disclosure.

The optical transmittance of the nanofiber transparent thin film is preferably 85% or more similar to an optical transmittance required for a general transparent electrode.

Referring to FIG. 4, the optical transmittances of the nanofiber transparent thin films obtained by coating the Nylon-6 nanofibers fabricated by performing electrospinning for 45 minutes with poly(vinylidene fluoride) (PVDF), poly(vinyl acetate) (PVAc), cellulose acetate (CA), poly(acrylic acid) (PAA), and polystyrene (PS) are 9%, 85%, 95%, and 75%, respectively.

The optical transmittance of the nanofiber transparent thin film coated with poly(vinylidene fluoride) (PVDF) is 9%, and the optical transmittance of the nanofiber transparent thin film coated with polystyrene (PS) is 75%. Therefore, it can be confirmed that the optical transmittances of the nanofiber transparent thin film coated with PVDF and the nanofiber transparent thin film coated with PS are less than the optical transmittance (85%) required for the general transparent electrode.

In addition, the optical transmittance of the nanofiber transparent thin film coated with poly(vinyl acetate) (PVAc) is 85%, the optical transmittance of the nanofiber transparent thin film coated with cellulose acetate (CA) is 89%, and the optical transmittance of the nanofiber transparent thin film coated with poly(acrylic acid) (PAA) is 95%. Therefore, it can be confirmed that the optical transmittances of the nanofiber transparent thin film coated with PVAc and the nanofiber transparent thin film coated with CA are the optical transmittance (85%) or more required for the general transparent electrode.

Referring back to Table 1, the optical transmittances of the nanofiber transparent thin films coated with poly(vinylidene fluoride) (PVDF) and polystyrene (PS) are less than the optical transmittance (85%) required for the general transparent electrode, and the refractive indices of the poly (vinylidene fluoride) (PVDF) and the polystyrene (PS) are 1.42 and 1.589, respectively.

Meanwhile, the optical transmittances of the nanofiber transparent thin films coated with poly(vinyl acetate) (PVAc), cellulose acetate (CA), and poly(acrylic acid) (PAA) are the optical transmittance (85%) or more required for the general transparent electrode, and the refractive indices of the poly(vinyl acetate) (PVAc), the cellulose acetate (CA), and the poly(acrylic acid) (PAA) are 1.467, 1.475, and 1.527, respectively.

Figure 5:
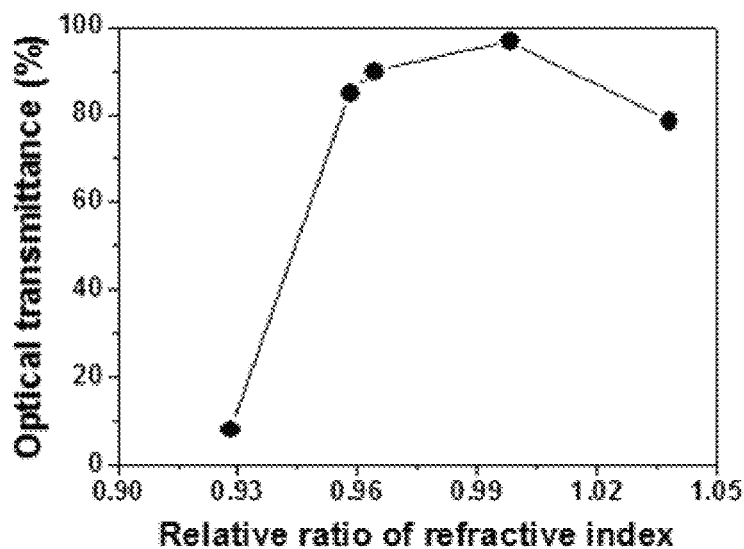
FIG. 5 is a graph showing optical transmittances of nanofiber transparent thin films coated with various polymers (PVDF, PVAc, CA, PAA, and PS) depending on relative ratios of refractive indices of various polymers (PVDF, PVAc, CA, PAA, and PS) to a refractive index of Nylon-6 according to an exemplary embodiment of the present disclosure.

FIG. 5 is a graph showing optical transmittances of nanofiber transparent thin films coated with various polymers (PVDF, PVAc, CA, PAA, and PS) depending on relative ratios of refractive indices of various polymers (PVDF, PVAc, CA, PAA, and PS) to a refractive index of Nylon-6 according to an exemplary embodiment of the present disclosure.

Referring to Table 1, ratios of refractive indices of poly (vinylidene fluoride) (PVDF), poly(vinyl acetate) (PVAc), cellulose acetate (CA), poly(acrylic acid) (PAA), and polystyrene (PS) to a refractive index of Nylon-6 are 0.928 (in case of PVDF), 0.959 (in case of PVAc), 0.964 (in case of CA), 0.998 (in case of PAA), and 1.039 (in case of PS), respectively.

Referring to FIG. 5, in the case in which the ratios of the refractive indices of the CA and the PAA to the refractive index of the Nylon-6 are 0.964 and 0.998, respectively, the optical transmittance of the nanofiber transparent thin film may exceed 85%. Here, a range of the ratio of each of the refractive indices of the cellulose acetate (CA) and the poly(acrylic acid) (PAA) to the refractive index of the Nylon-6 is 0.964 to 0.998:1.

Therefore, when a ratio of the refractive index of the polymer used in the nanofiber transparent thin film to the refractive index of the Nylon-6 is 0.964 to 0.998:1, the optical transmittance of the nanofiber transparent thin film may exceed the optical transmittance (85%) required for the general transparent electrode.

That is, the optical transmittance decreases due to a difference of the refractive indices of poly(vinylidene fluoride) (PVDF) and polystyrene (PS), whereas the optical transmittance increases due to a similar refractive index value between cellulose acetate (CA) and poly(acrylic acid) (PAA).

In the fiber-based foldable transparent electrode 110, the nanofiber transparent thin film described above is coated with a silver (Ag) nanowire. For example, in the fiber-based foldable transparent electrode 110, an adhesive layer is formed on the nanofiber transparent thin film and the adhesive layer may be spin-coated with a nanowire solution containing the silver (Ag) nanowire.

Here, the adhesive layer to be formed before spin-coating may be polyethyleneimine (PEI). In addition, a content of the silver (Ag) nanowire in the nanowire solution may be 0.025 wt % to 0.05 wt %.

Accordingly, according to an exemplary embodiment of the present disclosure, a fiber-based foldable transparent electrode having an optical transmittance of 85% or more and excellent mechanical properties such as a Young's modulus, a tensile strength, a toughness, and the like may be provided.

Hereinafter, specific experimental examples of the fiber-based foldable transparent electrode and the result of various experiments will be described.

First, a Nylon-6 nanofiber formed of 6 wt % of Nylon-6 is fabricated by electrospinning a Nylon-6 solution on a washed ITO glass substrate at 9 to 10 kV for 15 minutes to 60 minutes. Then, a cellulose acetate solution formed of 10 wt % of cellulose acetate is poured into the Nylon-6 nanofiber to fabricate a highly transparent nanofiber transparent thin film.

Here, the polymer used in the Nylon-6 nanofiber is not limited to cellulose acetate and may be a polymer having a ratio of a refractive index thereof to the refractive index of the Nylon-6 of 0.964 to 0.998:1. As an example, a polymer coated to the Nylon-6 nanofiber may include at least one of poly(vinyl acetate), cellulose acetate, or poly(acrylic acid).

Next, a fragment of the nanofiber transparent thin film is spin-coated with a nanowire solution formed of 0.025 wt % to 0.05 wt % of a silver (Ag) nanowire.

Here, an adhesive layer is formed on the fragment of the nanofiber transparent thin film, and then the adhesive layer may be spin-coated with the nanowire solution before the fragment of the nanofiber transparent thin film is spin-coated with the nanowire solution. Further, when the adhesive layers formed in a plurality of layers are spin-coated with plural nanowire solutions with different wt %, respectively, the silver (Ag) nanowires may be uniformly spread on the fragment of the nanofiber transparent thin film and may be interconnected well. Accordingly, a highly conductive and transparent fiber-based foldable transparent electrode 110 may be fabricated.

Figure 6:
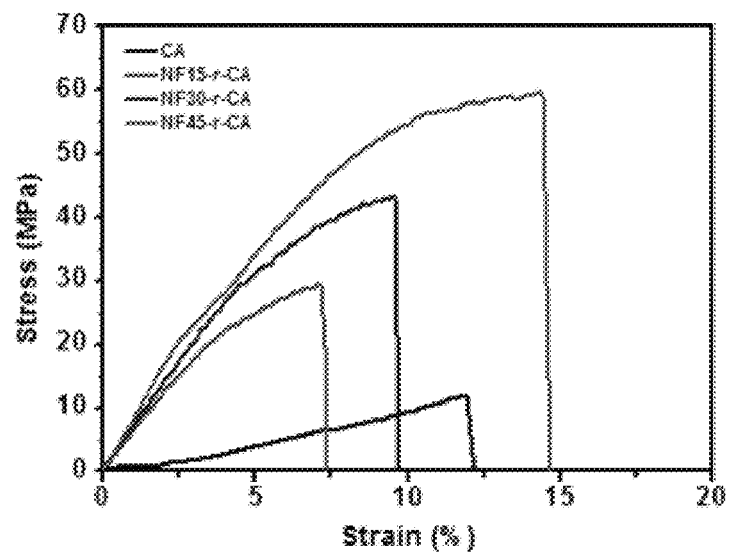
FIG. 6 is a graph showing stress-strain of a cellulose acetate film and each of nanofiber transparent thin films coated with cellulose acetate according to an exemplary embodiment of the present disclosure.

FIG. 6 is a graph showing stress-strain of a cellulose acetate film and each of nanofiber transparent thin films coated with cellulose acetate according to an exemplary embodiment of the present disclosure.

Referring to FIG. 6, stress-strain of the cellulose acetate film (CA film) shows a linear elastic strain peculiar to a thermoplastic elastomer. On the other hand, mechanical properties of the material are reflected in the stress-strain of the nanofiber transparent thin film coated with cellulose acetate (NF-r-CA film) well, as a result, higher mechanical properties are shown as the nanofiber electrospinning time increases (that is, as the content of the nanofiber increases). For example, a tensile strength of the nanofiber transparent thin film (NF-r-CA film) increases to 29.4 MPa, 43 MPa, and 60 MPa as an amount of nanofiber is increased by increasing electrospinning time to 15 minutes, 30 minutes, and 45 minutes.

Figures 7, 8:
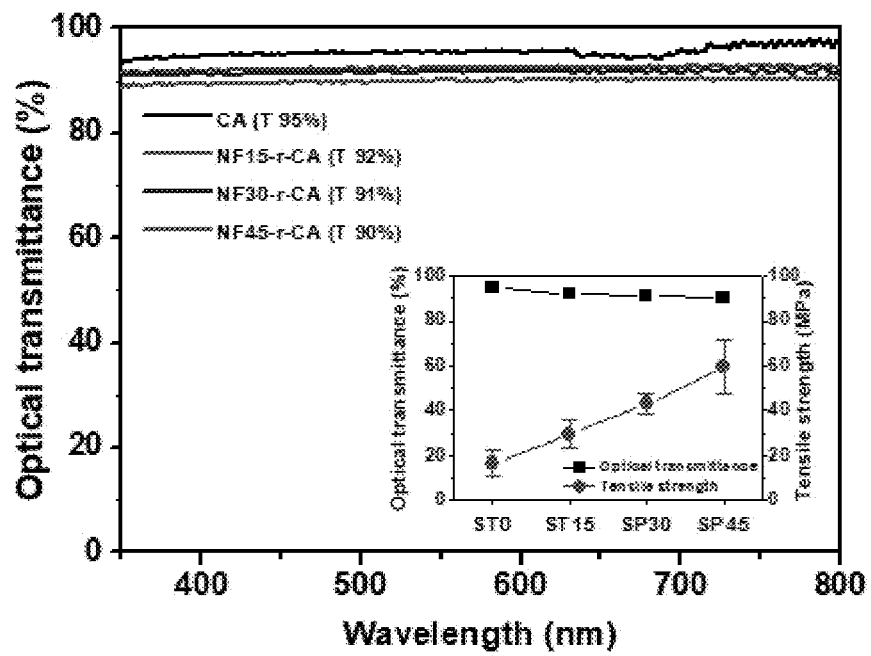
FIG. 7 is a graph showing optical transmittances of a cellulose acetate film and nanofiber transparent thin films coated with cellulose acetate according to an exemplary embodiment of the present disclosure.
FIG. 8 is a table showing values of a Young's modulus, a tensile strength, and a toughness of a cellulose acetate film and each of nanofiber transparent thin films coated with cellulose acetate depending on electrospinning time according to an exemplary embodiment of the present disclosure.

FIG. 7 is a graph showing optical transmittances of a cellulose acetate film and nanofiber transparent thin films coated with cellulose acetate according to an exemplary embodiment of the present disclosure.

Referring to FIG. 7, the optical transmittance is slightly decreased as a content of the nanofiber increases. However, even though the content of the nanofiber increases, 90% or more of the optical transmittance of the nanofiber transparent thin film is maintained. In addition, even though the content of the nanofiber increases, 90% or more of the tensile strength of the nanofiber transparent thin film is maintained.

FIG. 8 is a table showing values of a Young's modulus, a tensile strength, and a toughness of a cellulose acetate film and each of nanofiber transparent thin films coated with cellulose acetate depending on electrospinning time according to an exemplary embodiment of the present disclosure.

Referring to FIG. 8, it may be appreciated that a Young's modulus, a tensile strength, and a toughness of the nanofiber transparent thin film are changed depending on an amount of nanofiber which is changed depending on electrospinning time.

In detail, a toughness (which is defined as energy to be absorbed until rupturing) of NF45-r-CA (nanofiber transparent thin film being electrospun for 45 minutes) is 586.0 kN/mm or less, and the toughness of the NF45-r-CA is about 9 times a toughness of a CA film (pure cellulose acetate) of 65.7 kN/mm or less. As a result, it may be appreciated that the tensile strength and the toughness of the NF45-r-CA is greatly increased, such that the nanofiber provides effective reinforcement.

Figure 9A:
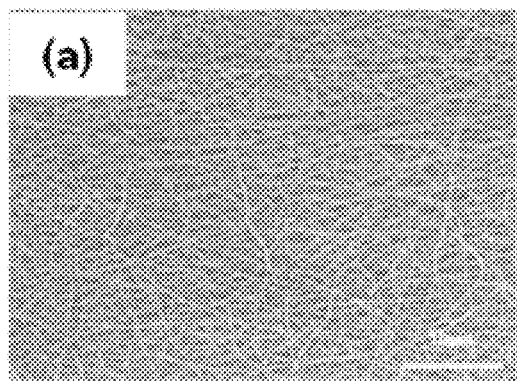
FIG. 9A is an electron micrograph of a Nylon-6 nanofiber.
Figure 9B:
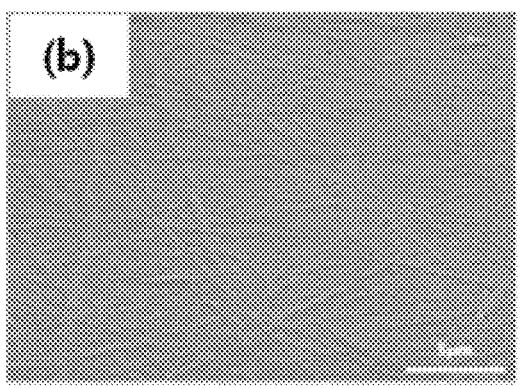
FIG. 9B is an electron micrograph of a nanofiber transparent thin film coated with cellulose acetate.
Figure 9C:
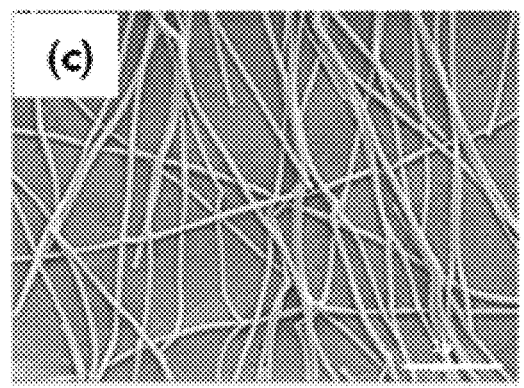
FIG. 9C is an electron micrograph of a fiber-based foldable transparent electrode surface-coated with a silver (Ag) nanowire.
Figure 9D:
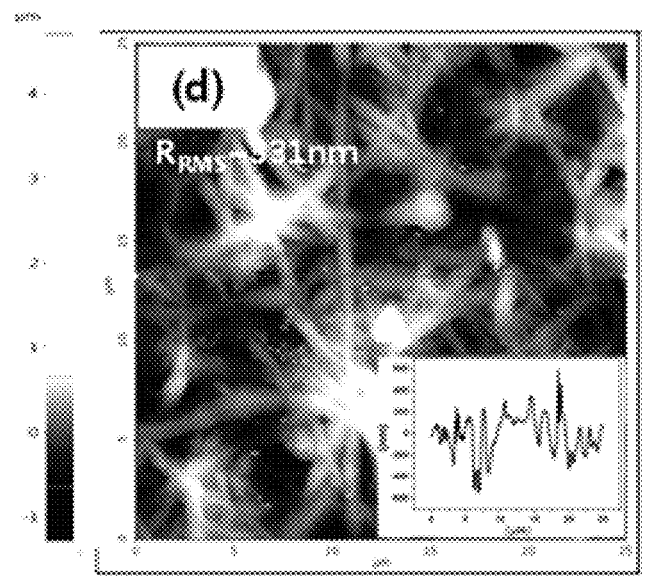
FIG. 9D is anatomic force micrograph of a Nylon-6 nanofiber.
Figure 9E:
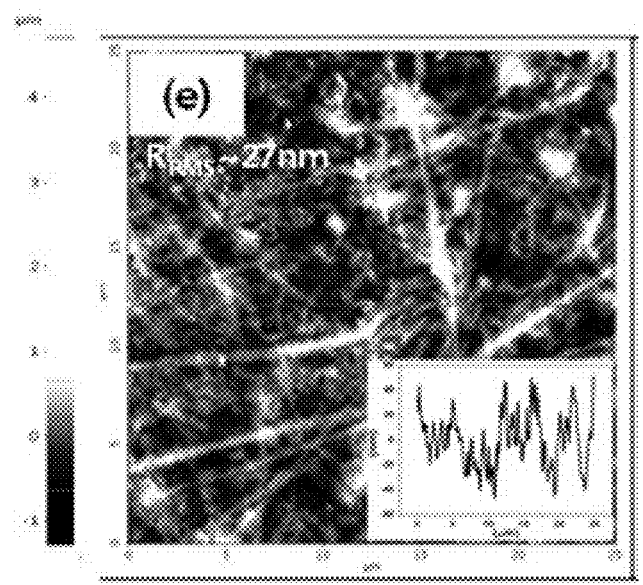
FIG. 9E is an atomic force micrograph of a nanofiber transparent thin film coated with cellulose acetate.
Figure 9F:
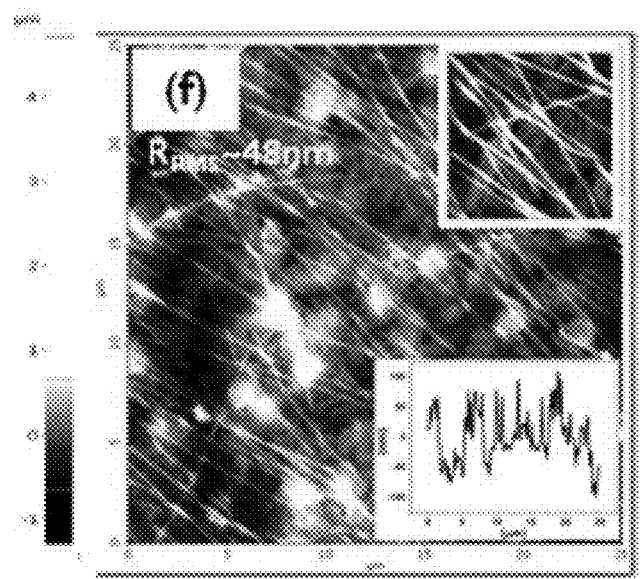
FIG. 9F is an atomic force micrograph of a fiber-based foldable transparent electrode surface-coated with a silver (Ag) nanowire, according to an exemplary embodiment of the present disclosure.

FIG. 9A is an electron micrograph of a Nylon-6 nanofiber, FIG. 9B is an electron micrograph of a nanofiber transparent thin film coated with cellulose acetate, FIG. 9C is an electron micrograph of a fiber-based foldable transparent electrode surface-coated with a silver (Ag) nanowire, FIG. 9D is an atomic force micrograph of a Nylon-6 nanofiber, FIG. 9E is an atomic force micrograph of a nanofiber transparent thin film coated with cellulose acetate, and FIG. 9F is an atomic force micrograph of a fiber-based foldable transparent electrode surface-coated with a silver (Ag) nanowire, according to an exemplary embodiment of the present disclosure.

Referring to FIGS. 9A to 9C, since a surface of the nanofiber having an average diameter of 120±25 nm has a shape in which the nanofibers formed of Nylon-6 are randomly arranged in a non-oriented state (FIG. 9A), and a surface of the nanofiber transparent thin film coated with cellulose acetate has a smooth shape, it may be appreciated that the cellulose acetate is successfully permeated into the Nylon-6 nanofibers (FIG. 9B) and a surface of the nanofiber transparent thin film is coated with the silver (Ag) nanowire well (FIG. 9C). Therefore, since light is scattered in a space between the nanofibers which are randomly arranged, light is not transmitted through the Nylon-6 nanofiber fabricated by electrospinning.

Referring back to FIGS. 9D to 9F, it may be appreciated that cellulose acetate is successfully permeated into a void of Nylon-6 nanofiber from the fact that a surface roughness $R_{RMS}$ of the Nylon-6 nanofiber is about 331 nm according to the atomic force micrograph of the Nylon-6 nanofiber (FIG. 9D) and a surface roughness $R_{RMS}$ of the nanofiber transparent thin film coated with cellulose acetate is about 27 nm according to the atomic force micrograph of the nanofiber transparent thin film coated with cellulose acetate (FIG. 9E). Further, it may be appreciated that a surface roughness $R_{RMS}$ of the fiber-based foldable transparent electrode is not greatly changed from that of the nanofiber transparent thin film from the fact that the surface roughness $R_{RMS}$ of the fiber-based foldable transparent electrode is about 48 nm according to the atomic force micrograph of the fiber-based foldable transparent electrode (FIG. 9F).

Figure 10A:
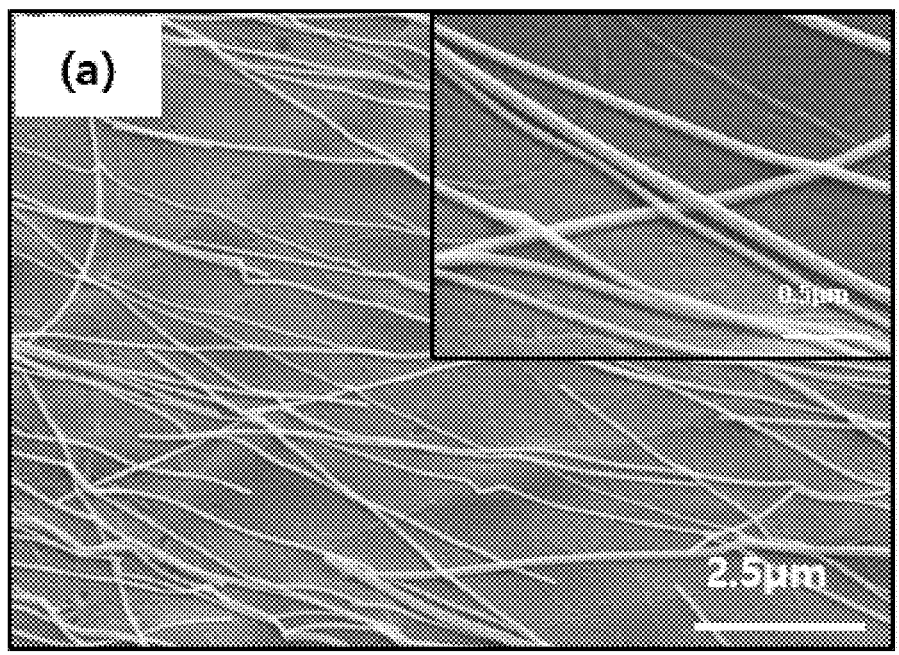
FIGS. 10A to 10C are electron micrographs of fiber-based foldable transparent electrodes depending on wt % of a silver (Ag) nanowire and FIG. 10D is a graph showing optical transmittances of the fiber-based foldable transparent electrodes according to an exemplary embodiment of the present disclosure.
Figure 10B:
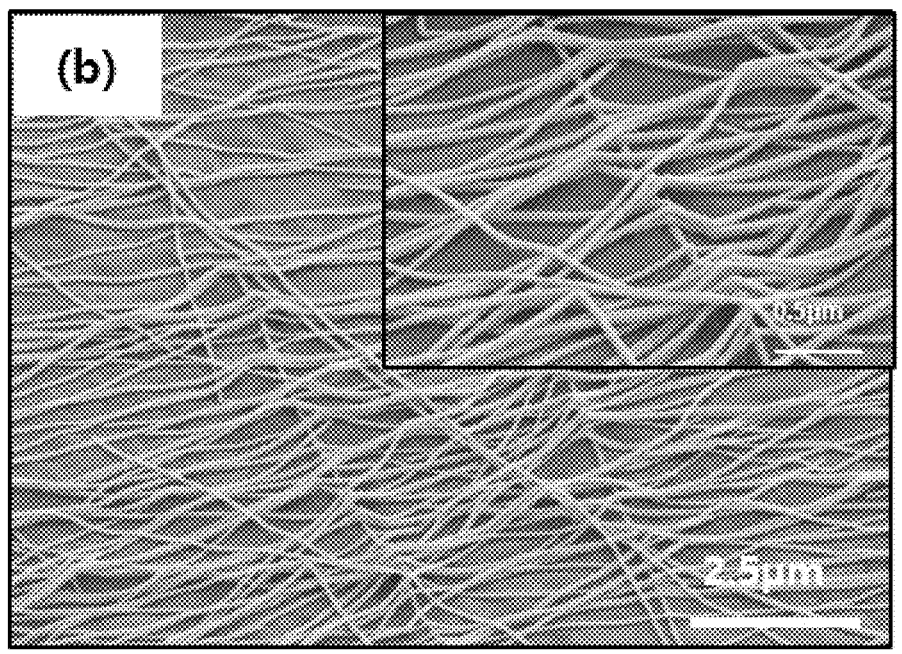
Figure 10C:
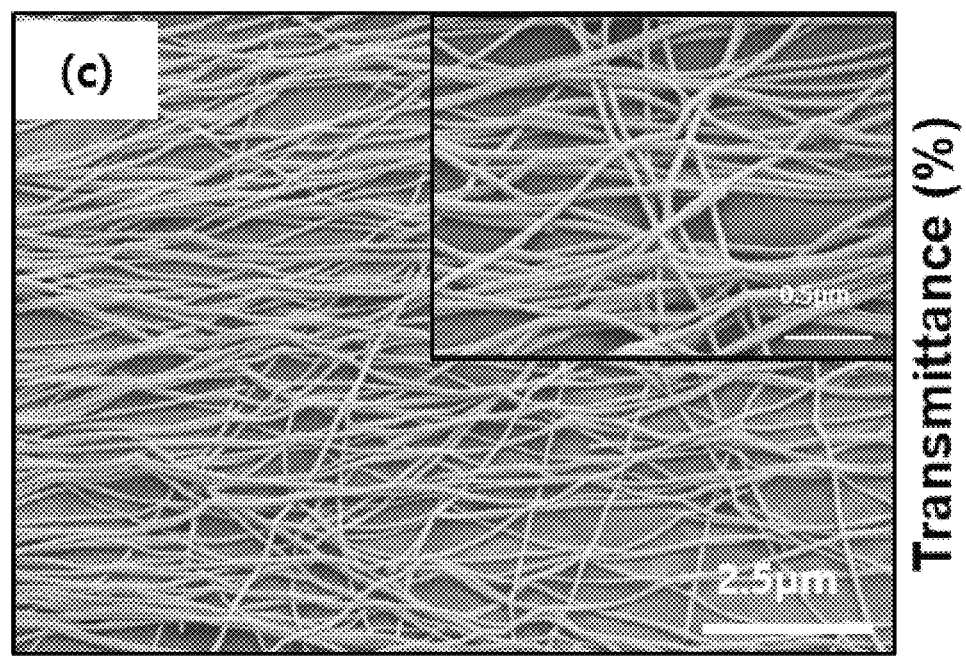
Figure 10D:
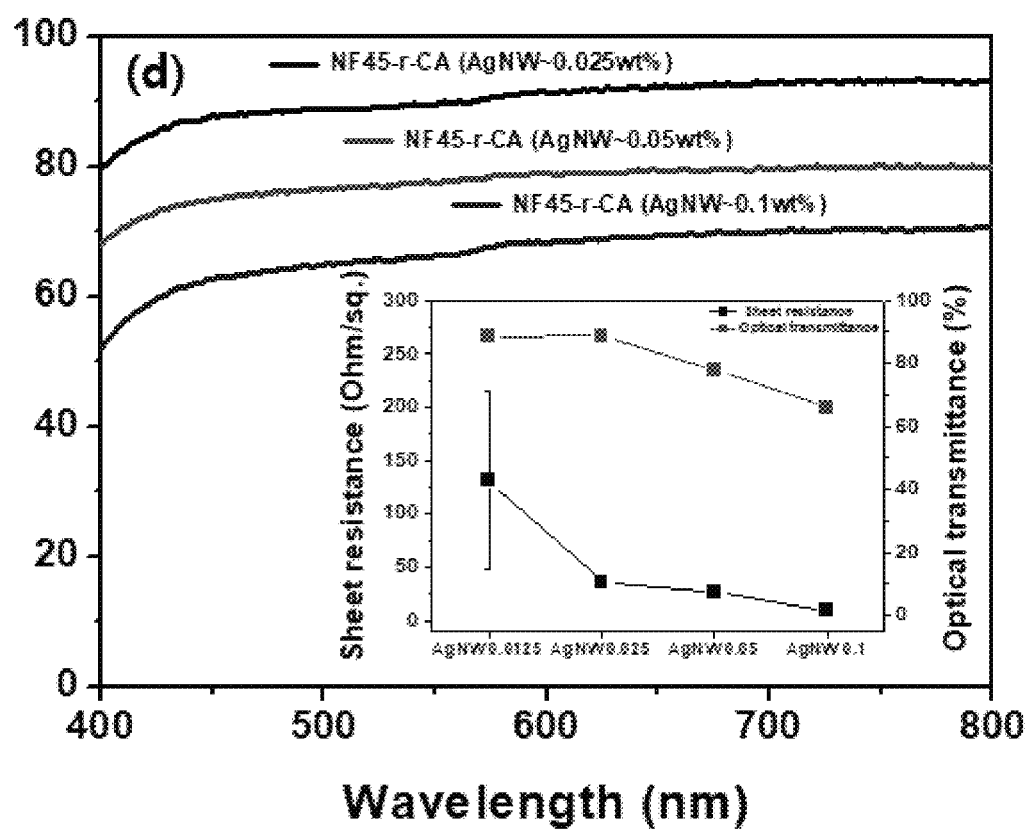

FIGS. 10A to 10C are electron micrographs of fiber-based foldable transparent electrodes depending on wt % of a silver (Ag) nanowire and FIG. 10D is a graph showing optical transmittances of the fiber-based foldable transparent electrodes according to an exemplary embodiment of the present disclosure.

Referring to FIGS. 10A to 10C, it may be appreciated that the silver (Ag) nanowire is firmly attached to the surface of the nanofiber transparent thin film formed of the Nylon-6 nanofiber fabricated by performing electrospinning for 45 minutes, such that the silver (Ag) nanowire is not easily removed from the surface of the nanofiber transparent thin film by a physical force such as bending, twisting, or the like.

Since an optical transmittance and a sheet resistance are in inverse proportion to each other, a concentration of the silver (Ag) nanowire in the nanowire solution was controlled in a range of 0.025 to 0.1 wt % so as to optimize a relationship between an average sheet resistance and the optical transmittance. FIGS. 10A to 10C show surface shapes of the fiber-based foldable transparent electrodes with different concentrations of the silver (Ag) nanowires. In this case, the concentrations of the silver (Ag) nanowires are 0.025 wt % (FIG. 10A), 0.05 wt % (FIG. 10B), and 0.1 wt % (FIG. 10C), respectively.

As shown in field emission-scanning electron microscope (FE-SEM) images (each inserted into FIGS. 10A to 10C), the silver (Ag) nanowire is firmly attached to the nanofiber transparent thin film and the silver (Ag) nanowire is not easily removed from the nanofiber transparent thin film by physical means such as bending, twisting, or the like. In this case, the PEI nano coating which is coated in advance as an adhesive layer contributes to improve adhesion between the silver (Ag) nanowire and the nanofiber transparent thin film formed of the polymer and the Nylon-6 nanofiber.

In FIG. 10D, the optical transmittances of the fiber-based foldable transparent electrodes with different concentrations of the silver (Ag) nanowire in the nanowire solution are shown. The sheet resistance and the optical transmittance are gradually decreased as the concentration of the silver (Ag) nanowire increases (inserted image of FIG. 10D). That is, when the silver (Ag) nanowire presents in the nanofiber transparent thin film, the silver (Ag) nanowire forms a conductive network which reduces the sheet resistance of the fiber-based foldable transparent electrode and blocks optical transmission of the transparent electrode.

In detail, the sheet resistance and the optical transmittance of the fiber-based foldable transparent electrode with 0.1 wt % of the silver (Ag) nanowire are sharply decreased to 9.8 ohm/sq and 66%, respectively, and the optical transmittance is too low, thus it is difficult to be used for the transparent electrode. In addition, the optical transmittance of the fiber-based foldable transparent electrode with 0.0125 wt % of the silver (Ag) nanowire is 90%, but the sheet resistance thereof is 40 ohm/sq, therefore, the sheet resistance is too high to be used for the transparent electrode.

On the other hand, it may be appreciated that the sheet resistance of the fiber-based foldable transparent electrode with 0.025 to 0.05 wt % of the silver (Ag) nanowire is 20 ohm/sq or less, and the optical transmittance thereof is 80% or more. Therefore, it is preferable that the content of the silver (Ag) nanowire in the nanowire solution is 0.025 wt % to 0.05 wt %.

Figure 11A:
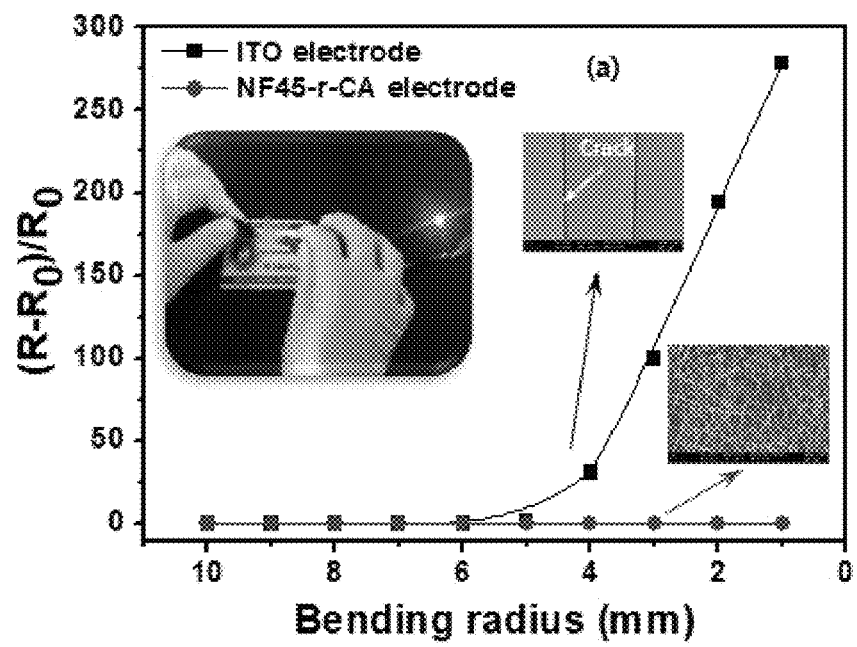
FIG. 11A is a graph showing relative changes in a sheet resistance between an indium tin oxide (ITO) electrode and a fiber-based foldable transparent electrode and FIG. 11B is a graph showing results of a repetitive bending test of the fiber-based foldable transparent electrode at an ultimate bending radius of 1 mm during 10,000 cycles according to an exemplary embodiment.
Figure 11B:
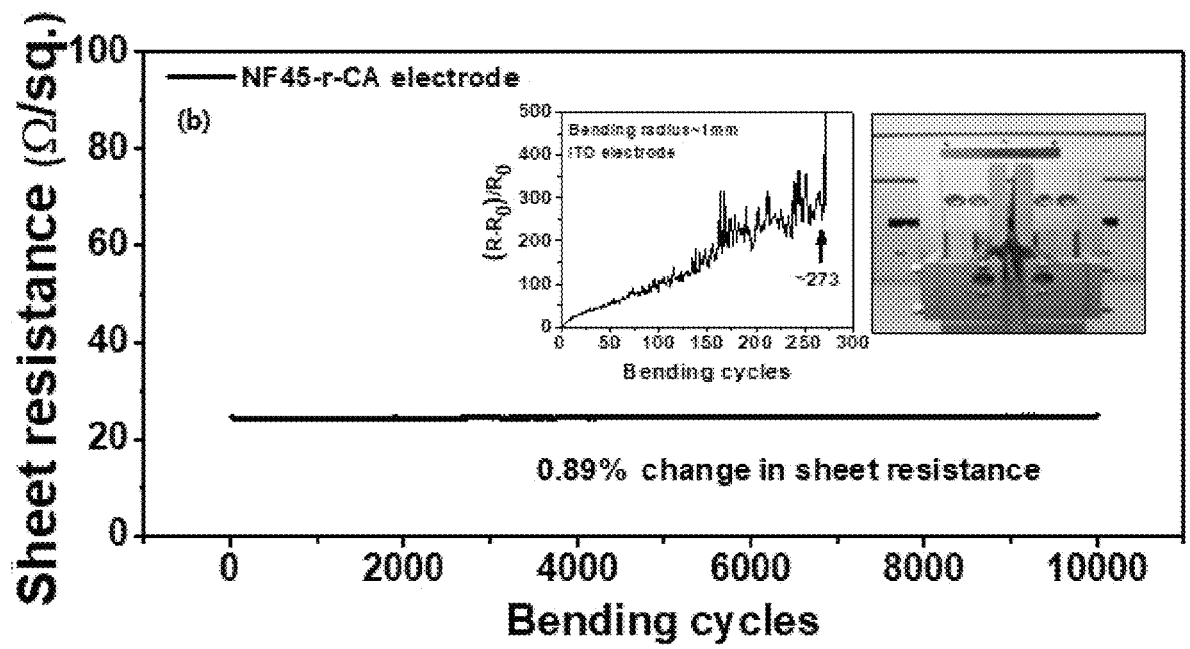

FIG. 11A is a graph showing relative changes in a sheet resistance between an indium tin oxide (ITO) electrode and a fiber-based foldable transparent electrode and FIG. 11B is a graph showing results of a repetitive bending test of the fiber-based foldable transparent electrode at an ultimate bending radius of 1 mm during 10,000 cycles according to an exemplary embodiment.

In FIG. 11A, the relative change in the sheet resistance with respect to a radius of curvature of the fiber-based foldable transparent electrode may be represented by (R-Ro)/Ro. Here, R is a resistance value after bending and Ro is a resistance value before bending. It may be appreciated that the fiber-based foldable transparent electrode according to an exemplary embodiment of the present disclosure has an excellent mechanical flexibility even after bending at an ultimate bending radius of 1 mm, whereas a sheet resistance of a conventional ITO electrode is sharply increased even after bending at a bending radius of 5 mm.

In FIG. 11B, it may be appreciated that the sheet resistance of the fiber-based foldable transparent electrode is almost constant and the relative change in the sheet resistance with respect to a radius of curvature after the repetitive bending test of 10,000 cycles is within 0.1%. Meanwhile, it may be appreciated that the sheet resistance of the conventional ITO electrode is gradually increased and an electrical signal is not generated after the repetitive bending test of 270 cycles or less.

Accordingly, it may be appreciated that the fiber-based foldable transparent electrode according to an exemplary embodiment of the present disclosure has an excellent flexibility for maintaining performance even under the ultimate bending at a radius of curvature of 1 mm.

Figure 12:
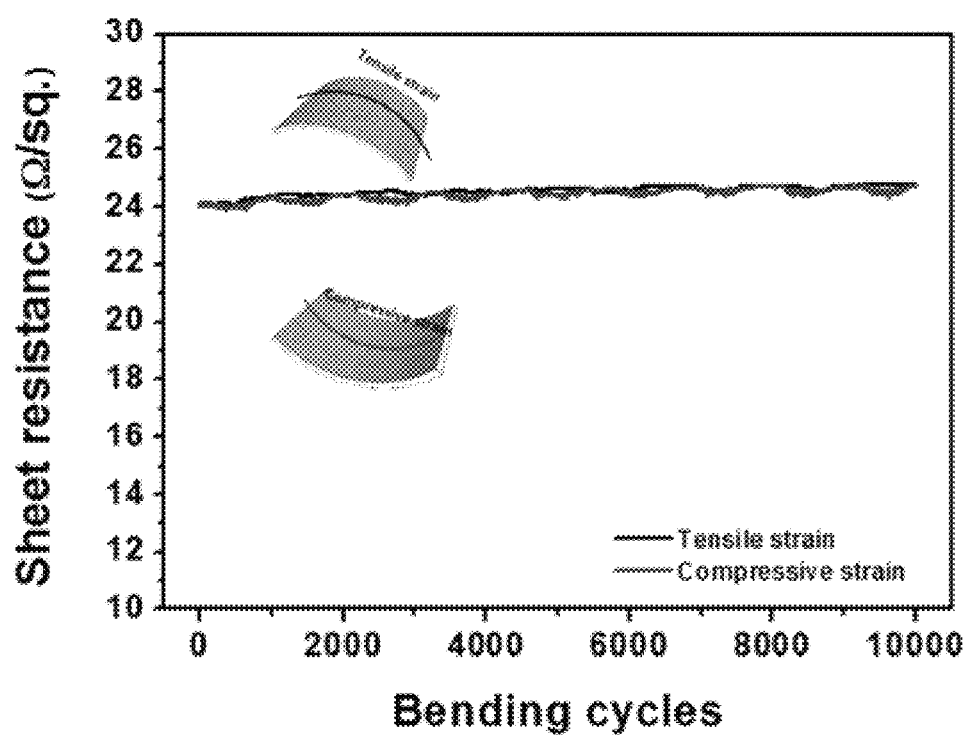
FIG. 12 is a graph showing changes in a sheet resistance of the fiber-based foldable transparent electrode during a mechanical strain bending (compressive and tensile strain) test at an ultimate bending radius of 1 mm according to an exemplary embodiment of the present disclosure.

FIG. 12 is a graph showing changes in a sheet resistance of the fiber-based foldable transparent electrode during a mechanical strain bending (compressive and tensile strain) test at an ultimate bending radius of 1 mm according to an exemplary embodiment of the present disclosure.

Referring to FIG. 12, considering that a silver (Ag) nanowire (NW) is coated on one surface of the fiber-based foldable transparent electrode, a bending test (compressive and tensile strain) was performed by two different methods such as an inner bending and an outer bending. As a result, it was confirmed that the fiber-based foldable transparent electrode is not affected by other mechanical strain bending (2 to 3% change in a ratio of the sheet resistance between before and after a repetitive bending cycle) and has flexibility after the repetitive bending test as well as excellent bending properties and reliability.

The dispersed liquid crystal 120 is formed by photocuring a mixture of a nematic liquid crystal and a photocurable monomer between the pair of fiber-based foldable transparent electrodes 110. Here, a content of the nematic liquid crystal may be 50 to 70 wt % and a content of the photocurable monomer may be 30 to 50 wt %. The mixture of the nematic liquid crystal and the photocurable monomer is photocured with irradiation using light from a light source.

The dispersed liquid crystal 120 is formed by photocuring the mixture of the nematic liquid crystal and the photocurable monomer positioned between the pair of fiber-based foldable transparent electrodes 110, thereby forming the flexible liquid crystal film 100.

Hereinafter, specific experimental examples of the fiber-based foldable transparent electrode according to an exemplary embodiment of the present disclosure and the result of various experiments will be described.

First, a Nylon-6 (PA-6) solution was prepared by using formic acid having a concentration of 6.0 wt %. Thereafter, the Nylon-6 solution was electrospun at a temperature of 20° C., a relative humidity of 40 to 50%, a tip-collector distance of 15 cm, and 9 to 10 kV. The electrospinning was performed for 15 to 60 minutes, and the electrospun Nylon-6 nanofibers were collected in an ITO glass substrate and vacuum-dried at room temperature for 24 hours.

Subsequently, the obtained Nylon-6 nanofiber was coated with a cellulose acetate (CA) solution dissolved in dimethylformamide (DMF) at a concentration of 10.0 wt %, dried at room temperature for 1 hour, and then vacuum-dried at room temperature for 24 hours.

Thereafter, the nanofiber transparent thin film formed of cellulose acetate and Nylon-6 nanofiber was peeled off from the ITO glass substrate and stored at room temperature. Here, the nanofiber transparent thin film becomes optically transparent due to similar refractive index (RI) values of the Nylon-6 and the cellulose acetate (PA-6: 1.53 and CA: 1.48). The nanofiber transparent thin films having different electrospinning times of 15, 30, 45, and 60 minutes are fabricated so as to investigate effect of the optical transmittance depending on a content of the Nylon-6 nanofiber. For convenience, the nanofiber transparent thin films are represented by NF15-r-CA (electrospinning time of 15 minutes), NF30-r-CA (electrospinning time of 30 minutes), NF45-r-

CA (electrospinning time of 45 minutes), and NF60-r-CA (electrospinning time of 60 minutes), respectively.

In addition, the nanofiber transparent thin film which is reinforced with the obtained Nylon-6 nanofiber was cut into a size of 2.5 cm×4 cm.

In addition, silver nanowires (AgNWs) dispersed in water (0.1 wt % of AgNWs dispersed in water, diameter: 40 nm, and length: 20 µm) were spin-coated on the nanofiber transparent thin film, a solvent was removed, the nanofiber transparent thin film was heated in an oven at 60° C. overnight so as to increase adhesion between the silver nanowire (AgNW) and the nanofiber transparent thin film. In this case, the adhesive layer formed of polyethyleneimine (PEI) was coated in advance before coating of the silver nanowire (AgNW).

Here, a multi-step spin-coating method was developed in order to prepare silver nanowire (AgNW) networks which are uniform and interconnected on the nanofiber transparent thin film. First, 0.1 wt % of a silver nanowire (AgNW) dispersion was diluted to 0.025 wt % and 0.05 wt %, respectively, and then used in a spin coating process. The silver nanowire dispersions (5 droplets) were spin-coated at 2,500 rpm for 45 seconds and 3,000 rpm for 45 seconds, respectively.

Therefore, the flexible liquid crystal film was fabricated using the fiber-based foldable transparent electrodes which are foldable, and transparent due to the coating of the silver (Ag) nanowire on the nanofiber transparent thin film. In addition, a commercial ITO electrode is used for comparison.

First, the ITO electrode and the fiber-based foldable transparent electrode were attached on a glass substrate by using a thermal release tape.

Then, in order to maintain a thickness, a spacer of 10 µm was dispersed in isopropyl alcohol (IPA) and sprayed on each of surfaces of the electrodes (ITO electrode and fiber-based foldable transparent electrode).

Then, a mixture of 60 wt % of a nematic liquid crystal and 40 wt % of a UV curable monomer was prepared and placed on each of the surfaces of the electrodes (ITO electrode and fiber-based foldable transparent electrode).

Then, an ITO electrode was disposed on the mixture on the ITO electrode and a fiber-based foldable transparent electrode was disposed on the mixture on the fiber-based foldable transparent electrode.

Subsequently, the electrodes are exposed to an ultraviolet ray of 365 nm at an intensity of 10 mW/cm$^2$ and at room temperature for 450 seconds.

Finally, the glass substrate was removed by using the thermal release tape at 100° C., thereby obtaining a flexible liquid crystal film using a fiber-based foldable transparent electrode.

Figure 13A:
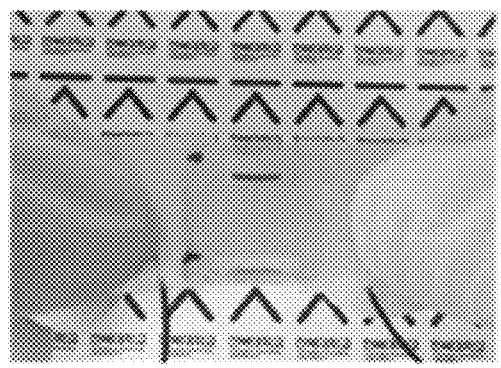
FIG. 13A is an image showing a voltage-OFF state of a flexible liquid crystal film using a fiber-based foldable transparent electrode and FIG. 13B is an image showing a voltage-ON state of a flexible liquid crystal film using a fiber-based foldable transparent electrode according to an exemplary embodiment of the present disclosure.
Figure 13B:
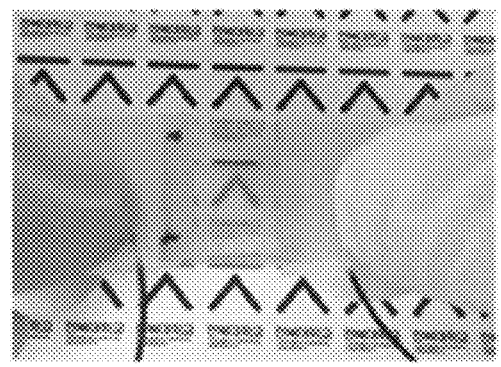

FIG. 13A is an image showing a voltage-OFF state of a flexible liquid crystal film using a fiber-based foldable transparent electrode and FIG. 13B is an image showing a voltage-ON state of a flexible liquid crystal film using a fiber-based foldable transparent electrode according to an exemplary embodiment of the present disclosure.

Referring to FIGS. 13A and 13B, it may be appreciated that in a case where no voltage is applied to the flexible liquid crystal film using the fiber-based foldable transparent electrode (OFF state), the flexible liquid crystal film is in a opaque state (FIG. 13A), and in a case where a voltage is applied to the flexible liquid crystal film using the fiber-based foldable transparent electrode (ON state), the flexible liquid crystal film is in a transparent state (FIG. 13B).

Figure 14A:
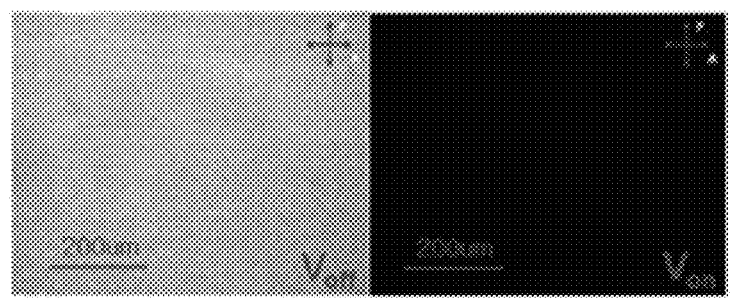
FIG. 14A is an image showing a transparent and opaque state of an ITO film and FIG. 14B is an image showing a transparent and opaque state of a flexible liquid crystal film using a fiber-based foldable transparent electrode according to an exemplary embodiment of the present disclosure.
Figure 14B:
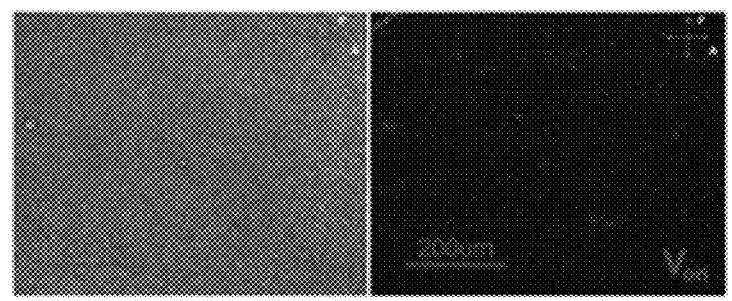

FIG. 14A is an image showing a transparent and opaque state of an ITO film and FIG. 14B is an image showing a transparent and opaque state of a flexible liquid crystal film using a fiber-based foldable transparent electrode according to an exemplary embodiment of the present disclosure.

When no external supply voltage is applied (Voff), randomly aligned liquid crystals (LC) inside a polymer matrix scatter incident light and make a polymer-dispersed liquid crystal (PDLC) film opaque. However, since LC molecules inside droplets are aligned in a direction of an electric field under application of a vertical electric field, refractive indices between axes of the polymer and the crystal liquid, such that the film is in a transparent state.

Referring to FIGS. 14A and 14B, an opaque and transparent state is successfully displayed in a voltage off (Voff) state and voltage on (Von) state. In particular, the flexible liquid crystal film using the fiber-based foldable transparent electrode is slightly exposed to light due to light scattering from the silver nanowire (AgNW), which is negligible in the film work. Therefore, the flexible liquid crystal film and the ITO film were almost similarly dark in the Von state.

Figure 15A:
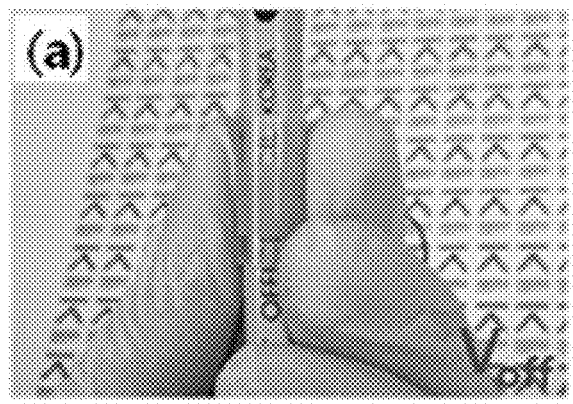
FIGS. 15A and 15B are images showing a voltage-OFF state and a voltage-ON state of a flexible liquid crystal film using a fiber-based foldable transparent electrode, respectively, in a case where the flexible liquid crystal film using the fiber-based foldable transparent electrode is wound around a pen according to an exemplary embodiment of the present disclosure.
Figure 15B:
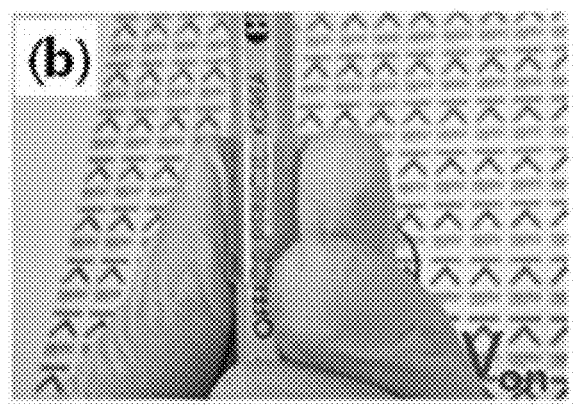

FIGS. 15A and 15B are images showing a voltage-OFF state and a voltage-ON state of a flexible liquid crystal film using a fiber-based foldable transparent electrode, respectively, in a case where the flexible liquid crystal film using the fiber-based foldable transparent electrode is wound around a pen according to an exemplary embodiment of the present disclosure.

Referring to FIGS. 15A and 15B, when the flexible liquid crystal film using the fiber-based foldable transparent electrode is wound around the pen, an opaque state according to a voltage off (Voff) and a transparent state according to a voltage on (Von) are shown. It can be confirmed that in the flexible liquid crystal film using the fiber-based foldable transparent electrode, a highly transparent and foldable fiber-based foldable transparent electrode is operated well even in a bended state.

Figure 16A:
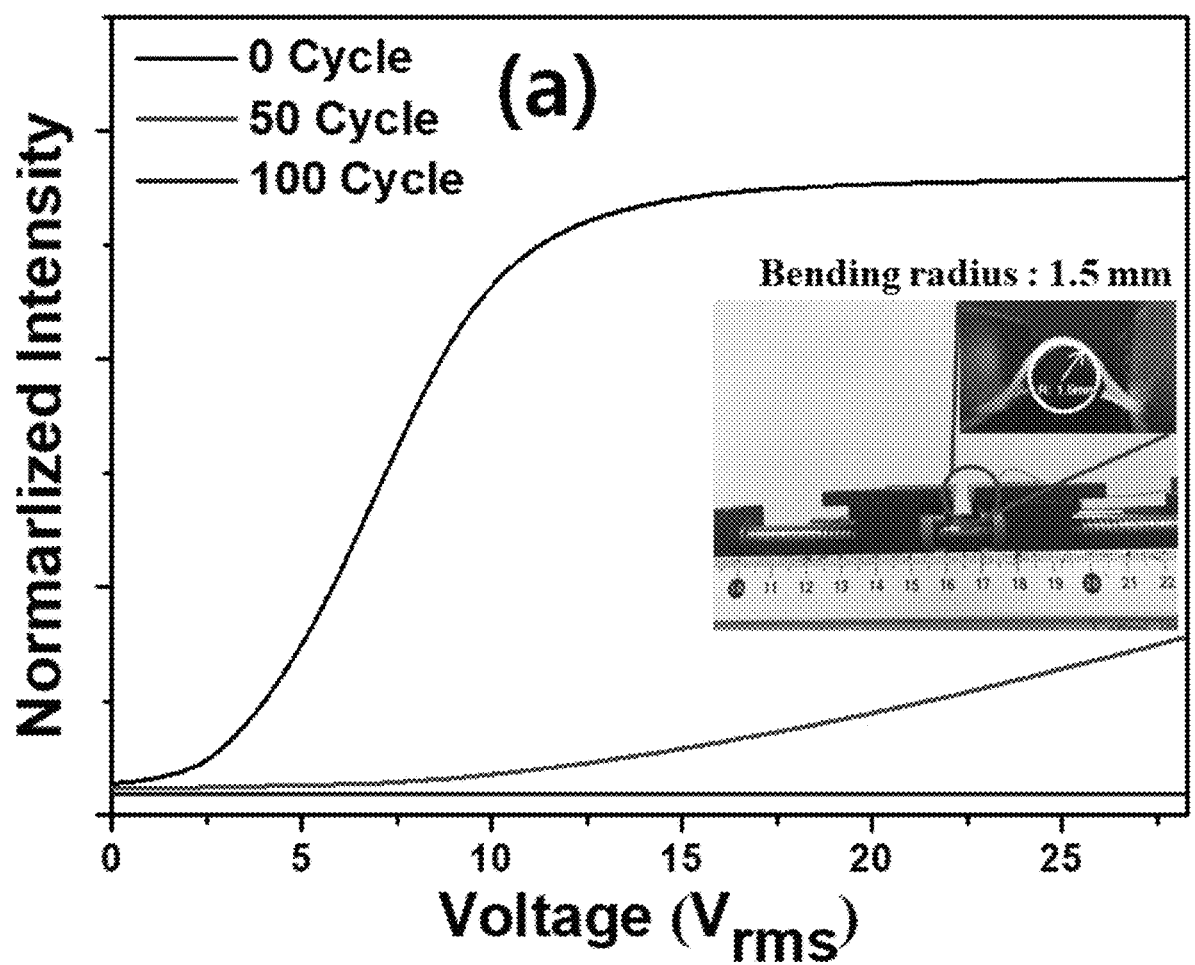
FIGS. 16A and 16B are graphs showing a V-T curve of an ITO film and a V-T curve of a flexible liquid crystal film using a fiber-based foldable transparent electrode, respectively, before and after a repetitive bending test is performed at an ultimate bending radius of 1.5 mm, respectively, according to an exemplary embodiment of the present disclosure.
Figure 16B:
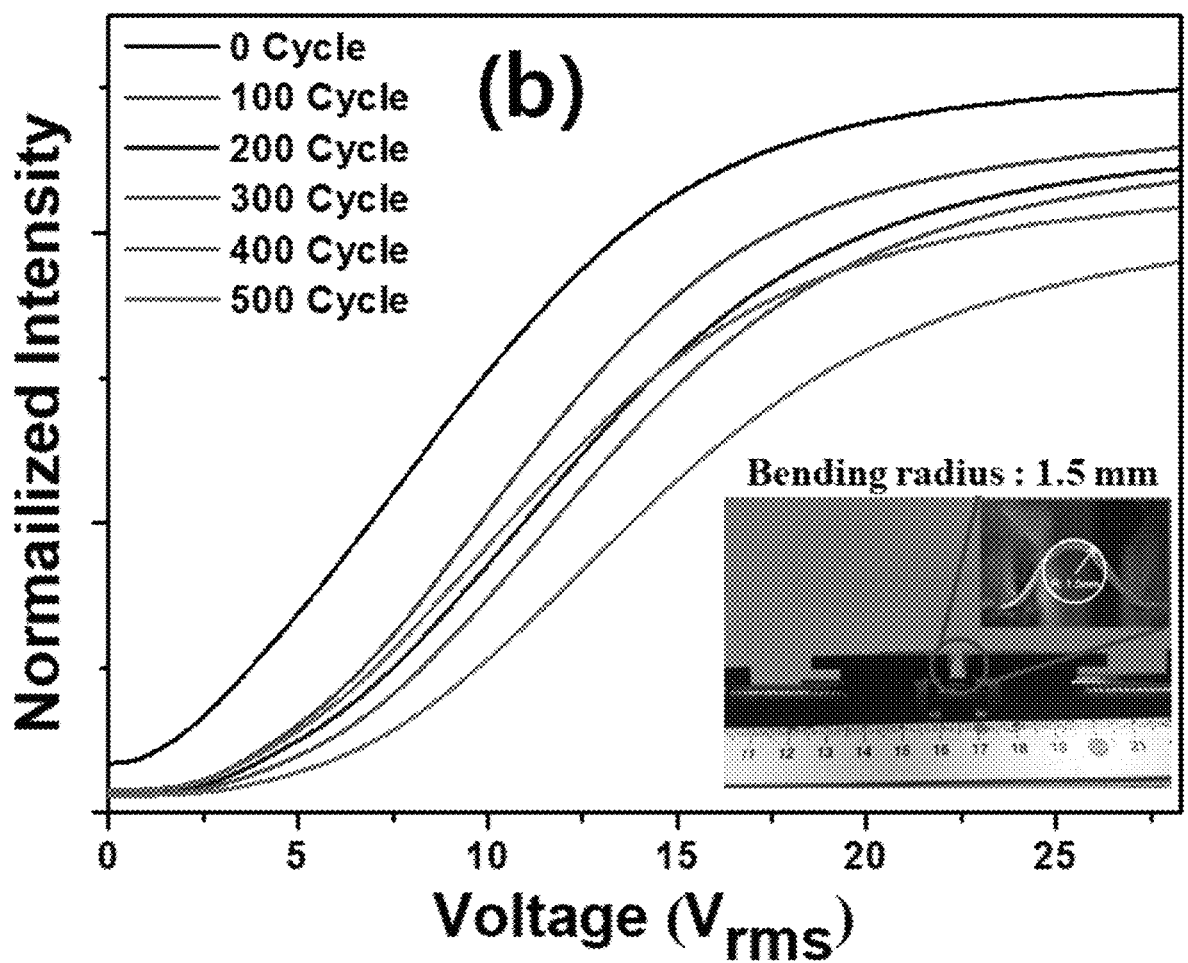

FIGS. 16A and 16B are graphs showing a V-T curve of an ITO film and a V-T curve of a flexible liquid crystal film using a fiber-based foldable transparent electrode, respectively, before and after a repetitive bending test is performed at an ultimate bending radius of 1.5 mm, respectively, according to an exemplary embodiment of the present disclosure.

Referring to FIGS. 16A and 16B, V-T curves of an ITO electrode-based film (ITO film) and a flexible liquid crystal film using an NF-r-CA-based (fiber-based) foldable transparent electrode in which CA polymer and Nylon-6 are used are shown, the ITO film and the flexible liquid crystal film having a different bending cycle at an ultimate bending radius of 1.5 mm.

Although a driving voltage of the flexible liquid crystal film using the NF-r-CA-based (fiber-based) foldable transparent electrode was relatively higher than that of the ITO film, the flexible liquid crystal film using the NF-r-CA-based (fiber-based) foldable transparent electrode exhibited higher electro-optic stability than that in the ITO film in a bending test.

In particular, the flexible liquid crystal film using the fiber-based foldable transparent electrode maintained a vertical electric field constantly even after the bending test of 500 cycles, while an operation of the ITO film was stopped after the bending test of 50 cycles only.

Therefore, it can be confirmed that in comparison to the ITO electrode, the flexible liquid crystal film using the fiber-based foldable transparent electrode can maintain the working stability even after the bending test of 500 cycles at an ultimate bending radius of 1.5 mm due to an excellent flexibility of the NF-r-CA-based (fiber-based) foldable transparent electrode which can be ultimately foldable and is highly transparent.

Figure 17:
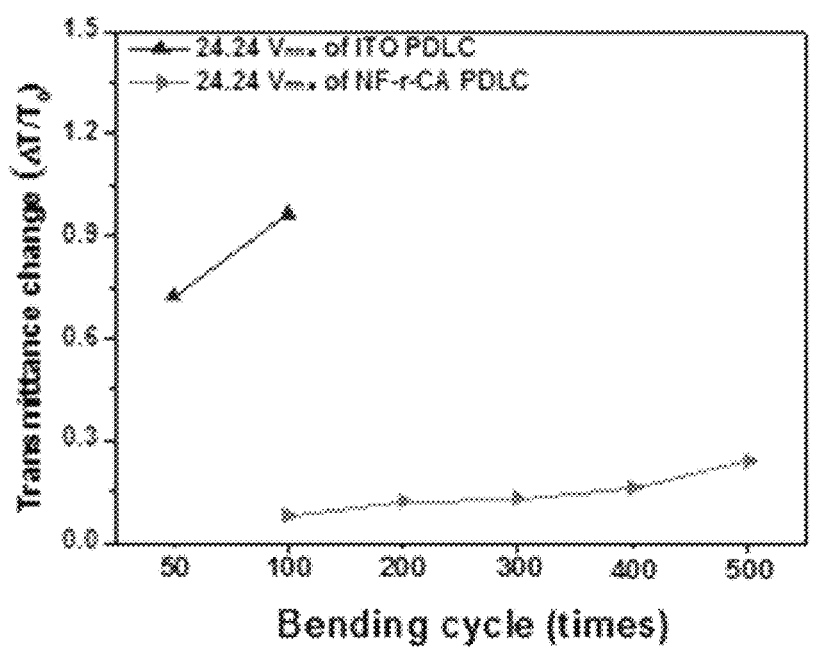
FIG. 17 is a graph showing a relative change in optical transmittance between an ITO film and a flexible liquid crystal film using a fiber-based foldable transparent electrode at an applied voltage of 24.24 Vrms after a repetitive bending test according to an exemplary embodiment of the present disclosure.

FIG. 17 is a graph showing a relative change in optical transmittance between an ITO film and a flexible liquid crystal film using a fiber-based foldable transparent electrode at an applied voltage of 24.24 Vrms after a repetitive bending test according to an exemplary embodiment of the present disclosure.

Optical transmittance change may be represented by $\Delta T/T_o$. $\Delta T$ represents a change in values of the optical transmittance after the bending test and $T_o$ represents an initial value of the optical transmittance.

Referring to FIG. 17, the optical transmittance of the ITO film (ITO PDLC) was sharply changed between 50 and 100 cycles of the bending test under an applied voltage of 24.24 Vrms. On the other hand, changes in the optical transmittance of the flexible liquid crystal film using the fiber-based foldable transparent electrode (NF-r-CA PDLC) were observed in the bending test of 100 cycles and increased gradually up to 500 cycles.

The sharp change in the optical transmittance of the ITO film may be caused by the absence of the vertical electric field due to rupture of the ITO electrode. Meanwhile, since the flexible liquid crystal film using the fiber-based foldable transparent electrode can be ultimately foldable and has the highly transparent NF-r-CA-based (fiber-based) foldable transparent electrode having mechanical stability, it seems that an alignment direction of the liquid crystals in each bending test (after 100, 200, 300, 400, and 500 cycles) is changed into a vertical direction along the applied field direction at 24.24 Vrms. These results demonstrate that the flexible liquid crystal film using the fiber-based foldable transparent electrode has an excellent foldable stability at an ultimate bending radius of 1.5 mm.

Figure 18:
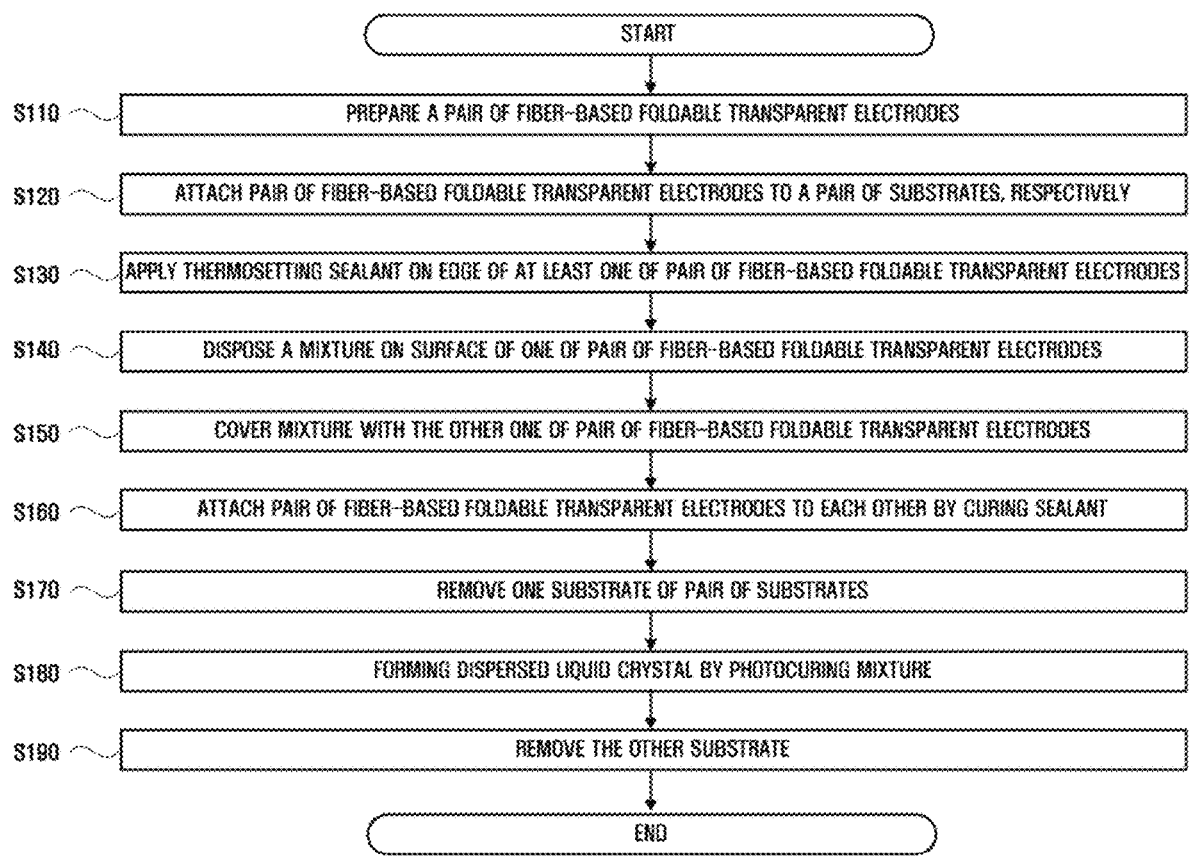
FIG. 18 is a flowchart showing a method of fabricating a flexible liquid crystal film using a fiber-based foldable transparent electrode according to an exemplary embodiment of the present disclosure.

FIG. 18 is a flowchart showing a method of fabricating a flexible liquid crystal film using a fiber-based foldable transparent electrode according to an exemplary embodiment of the present disclosure. In addition, FIG. 19 is a flowchart showing a step of preparing a pair of fiber-based foldable transparent electrodes according to an exemplary embodiment of the present disclosure.

Referring to FIG. 18, a method of fabricating a flexible liquid crystal film using a fiber-based foldable transparent electrode according to an exemplary embodiment of the present disclosure, includes: preparing a pair of fiber-based foldable transparent electrodes (S110), attaching the pair of fiber-based foldable transparent electrodes to a pair of substrates, respectively, using a thermal release tape (S120), applying a thermosetting sealant including a spacer on an edge of at least one of the pair of fiber-based foldable transparent electrodes (S130), disposing a mixture formed of a nematic liquid crystal and a photocurable monomer on a surface of at least one of the pair of fiber-based foldable transparent electrodes (S140), covering an upper portion of the mixture with the other one of the pair of fiber-based foldable transparent electrodes (S150), attaching the pair of fiber-based foldable transparent electrodes to each other by curing the thermosetting sealant with heat (S160), removing one substrate of the pair of substrates by separating the thermal release tape from the pair of fiber-based foldable transparent electrodes (S170), forming a dispersed liquid crystal by photocuring the mixture with light irradiation (S180), and removing the other substrate of the pair of substrates by separating the thermal release tape from the pair of fiber-based foldable transparent electrodes (S190).

Here, in the case of preparing the transparent electrode (S110), a pair of fiber-based foldable transparent electrodes in which a nanofiber transparent thin film formed of a polymer and a Nylon-6 nanofiber is coated with a silver (Ag) nanowire and a fiber-based foldable transparent electrode including a dispersed liquid crystal formed by being cured between the pair of fiber-based foldable transparent electrodes are prepared. Referring to FIG. 19, a Nylon-6 nanofiber is formed by electrospinning a spinning solution containing Nylon-6 (S112), a nanofiber transparent thin film is formed by coating the Nylon-6 nanofiber with a polymer (S114), an adhesive layer is formed on the nanofiber transparent thin film (S116), and the adhesive layer is spin-coated with a nanowire solution containing a silver (Ag) nanowire.

In addition, in the case of attaching the pair of fiber-based foldable transparent electrodes, respectively (S120), each of the fiber-based foldable transparent electrodes may be attached to a plastic substrate and a glass substrate, respectively. For example, the thermal release tape is attached to the plastic substrate and the glass substrate, respectively. Thereafter, the fiber-based foldable transparent electrode may be attached to the plastic substrate using the thermal release tape and the fiber-based foldable transparent electrode may be attached to the glass substrate using the thermal release tape.

In addition, in the case of applying the thermosetting sealant (S130), a thermosetting sealant containing a spacer for maintaining a cell gap is applied on an edge of the fiber-based foldable transparent electrode attached to the glass substrate.

In addition, in the case of disposing the mixture (S140), the mixture may be formed of 50 to 70 wt % of the nematic liquid crystal and 30 to 50 wt % of the photocurable monomer.

In addition, in the case of covering an upper portion of the mixture with the other one of the pair of fiber-based foldable transparent electrodes (S150), the glass substrate may be positioned at the bottom and the plastic substrate may cover an upper portion of the glass substrate. That is, the fiber-based foldable transparent electrode attached to the glass substrate becomes a lower electrode and the fiber-based foldable transparent electrode attached to the plastic substrate becomes an upper electrode.

In addition, in the case of attaching the pair of fiber-based foldable transparent electrodes to each other (S160), the upper and lower fiber-based foldable transparent electrodes may be attached to each other by using a roller and curing the thermosetting sealant with heat generated from the roller.

In addition, in the case of removing one substrate of the pair of substrates (S170), the plastic substrate may be removed by separating the thermal release tape attached to the plastic substrate.

In addition, in the case of forming the dispersed liquid crystal (S180), the dispersed liquid crystal may be formed by photocuring a mixture layer in the pair of fiber-based foldable transparent electrode by irradiating the mixture layer with light from a light source of an ultraviolet ray of 365 nm.

In addition, in the case of removing the other substrate of the pair of substrates (S190), the glass substrate may be removed by separating the thermal release tape attached to the glass substrate, thus and the flexible liquid crystal film using the fiber-based foldable transparent electrode is fabricated.

A fiber-based foldable transparent electrode is expected to be applicable to a capacitive touch panel, a transparent electromagnetic wave shielding film, a dye-sensitized solar cell, a flexible display, and the like, and will gradually replace ITO which is a conventional transparent electrode material. A flexible liquid crystal film using the fiber-based foldable transparent electrode may be applied to portable or wearable devices (display, smart window, micro lens, sensor, and the like).

Although the exemplary embodiments of the present disclosure have been described with reference to the accompanying drawings, it will be understood by those skilled in the art to which the present disclosure pertains that the present disclosure can be carried out in other detailed forms without changing the technical spirits and essential features thereof. Therefore, the above-described exemplary embodiments are exemplary in all aspects, and should be construed not to be restrictive.

What is claimed is:

1. A flexible liquid crystal film using a fiber-based foldable transparent electrode, comprising:
a pair of fiber-based foldable transparent electrodes in which a nanofiber transparent thin film formed of a polymer and a Nylon-6 nanofiber is coated with a silver (Ag) nanowire; and
a dispersed liquid crystal formed by being cured between the pair of fiber-based foldable transparent electrodes, wherein in the fiber-based foldable transparent electrode, an adhesive layer is formed on the nanofiber transparent thin film, and a nanowire solution containing the silver (Ag) nanowire is spin coated on the adhesive layer, and
wherein the adhesive layer is formed of polyethyleneimine (PEI).

2. The flexible liquid crystal film of claim 1, wherein in the nanofiber transparent thin film, a ratio of a refractive index of the polymer to a refractive index of Nylon-6 of the Nylon-6 nanofiber is 0.964 to 0.998:1.

3. The flexible liquid crystal film of claim 1, wherein the polymer includes at least one of poly(vinyl acetate), cellulose acetate, or poly(acrylic acid).

4. The flexible liquid crystal film of claim 1, wherein a content of the silver (Ag) nanowire in the nanowire solution is 0.025 wt % to 0.05 wt %.

5. The flexible liquid crystal film of claim 1, wherein the dispersed liquid crystal is formed by photocuring a mixture of a nematic liquid crystal and a photocurable monomer between the pair of fiber-based foldable transparent electrodes.

* * * * *